(12) United States Patent
Huberman et al.

(10) Patent No.: US 8,316,234 B2
(45) Date of Patent: Nov. 20, 2012

(54) ENCODED ATTRIBUTE MATCHING ON COMMUNICATION DEVICES

(75) Inventors: Bernardo A. Huberman, Palo Alto, CA (US); Stephen P. Sorkin, Berkley, CA (US); Joshua R. Tyler, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1995 days.

(21) Appl. No.: 10/695,198

(22) Filed: Oct. 28, 2003

(65) Prior Publication Data
US 2005/0090231 A1    Apr. 28, 2005

(51) Int. Cl.
H04L 9/32    (2006.01)
(52) U.S. Cl. ............ 713/168; 713/161; 713/187; 726/5; 726/19; 726/27; 380/44; 380/283; 455/411
(58) Field of Classification Search .................. 713/168
See application file for complete search history.

(56) References Cited

U.S. PATENT DOCUMENTS

| | | | |
|---|---|---|---|
| 6,594,762 B1 * | 7/2003 | Doub et al. ...................... | 726/35 |
| 6,618,593 B1 * | 9/2003 | Drutman et al. ............. | 455/456.3 |
| 6,868,074 B1 * | 3/2005 | Hanson .......................... | 370/328 |
| 2003/0158960 A1 * | 8/2003 | Engberg ......................... | 709/237 |
| 2004/0133640 A1 * | 7/2004 | Yeager et al. ................. | 709/204 |
| 2004/0192383 A1 * | 9/2004 | Zacks et al. .................... | 455/557 |
| 2005/0086300 A1 * | 4/2005 | Yeager et al. ................. | 709/204 |

OTHER PUBLICATIONS

Huberman et al., "Enhancing Privacy and Trust in Electronic Communities", 1999, ACM, pp. 78-86.*
Textually.org all about texting, SMS and MMS, Virtual Cell Phone Dating, Jun. 29, 2003 (1 p.); [online] http://www.textually.org/textually/archives/000973.htm.
SMSFlirt, SMSFlirt—Leader in SMS Services, undated (1 p.); [online]  http://www.smsflirt.ch/cgi-bin/smsflirt.cgi?function=getdocument&document=index&langu...

* cited by examiner

*Primary Examiner* — Shewaye Gelagay

(57) ABSTRACT

A first communication device ("FCD") is adapted to communicate with a second communication device. The FCD obtains a first key, encodes an attribute in the FCD with the first key to produce a first encoded value, and transmits the first encoded value to the second communication device. The FCD also receives a second encoded value from the second communication device. The second encoded value comprises an attribute stored in the second communication device that has been encoded with a second key. Further, the FCD encodes the second encoded value with the first key to produce a third encoded value, transmits the third encoded value to the second communication device, and receives a fourth encoded value from the second communication device. The fourth encoded value comprises the first encoded value after being encoded by the second key. The FCD determines whether the third encoded value matches the fourth encoded value.

24 Claims, 3 Drawing Sheets

ENCODED ATTRIBUTE MATCHING ON COMMUNICATION DEVICES

BACKGROUND

1. Field of the Subject Matter

This disclosure generally relates to communication devices.

2. Background Information

Individuals with similar backgrounds, common acquaintances or parallel business interests may pass by one another on an everyday basis and may never meet. Occurrences such as these may amount to missed friendship, dating and/or business opportunities.

BRIEF SUMMARY

In some embodiments, a method is usable on a first communication device adapted to communicate with a second communication device. The method may comprise obtaining a first key, encoding an attribute in the first communication device with the first key to produce a first encoded value, and transmitting the first encoded value to the second communication device. The method also may comprise receiving a second encoded value from the second communication device. The second encoded value may comprise an attribute stored in the second communication device that has been encoded with a second key associated with the second communication device. Further, the method may comprise encoding the second encoded value with the first key to produce a third encoded value, transmitting the third encoded value to the second communication device, and receiving a fourth encoded value from the second communication device. The fourth encoded value may comprise the first encoded value after being encoded by the second key. The method also comprises determining whether the third encoded value matches the fourth encoded value.

In other embodiments, a communication device may comprise a processor, memory accessible to the processor and containing an attribute and software executable on the processor, and a communication interface coupled to the processor and adapted to permit the communication device to communicate with at least one other external device. By executing the software, the processor may determine whether the communication device's attribute matches an attribute stored in an external device, without receiving the attributes from the external device, based on a first encoded value received via the local communication interface from the external device. The first encoded value is indicative of an attribute stored in the external device.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or though an indirect connection via other devices and connections.

DETAILED DESCRIPTION

The following discussion is directed to various embodiments of the invention. The embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
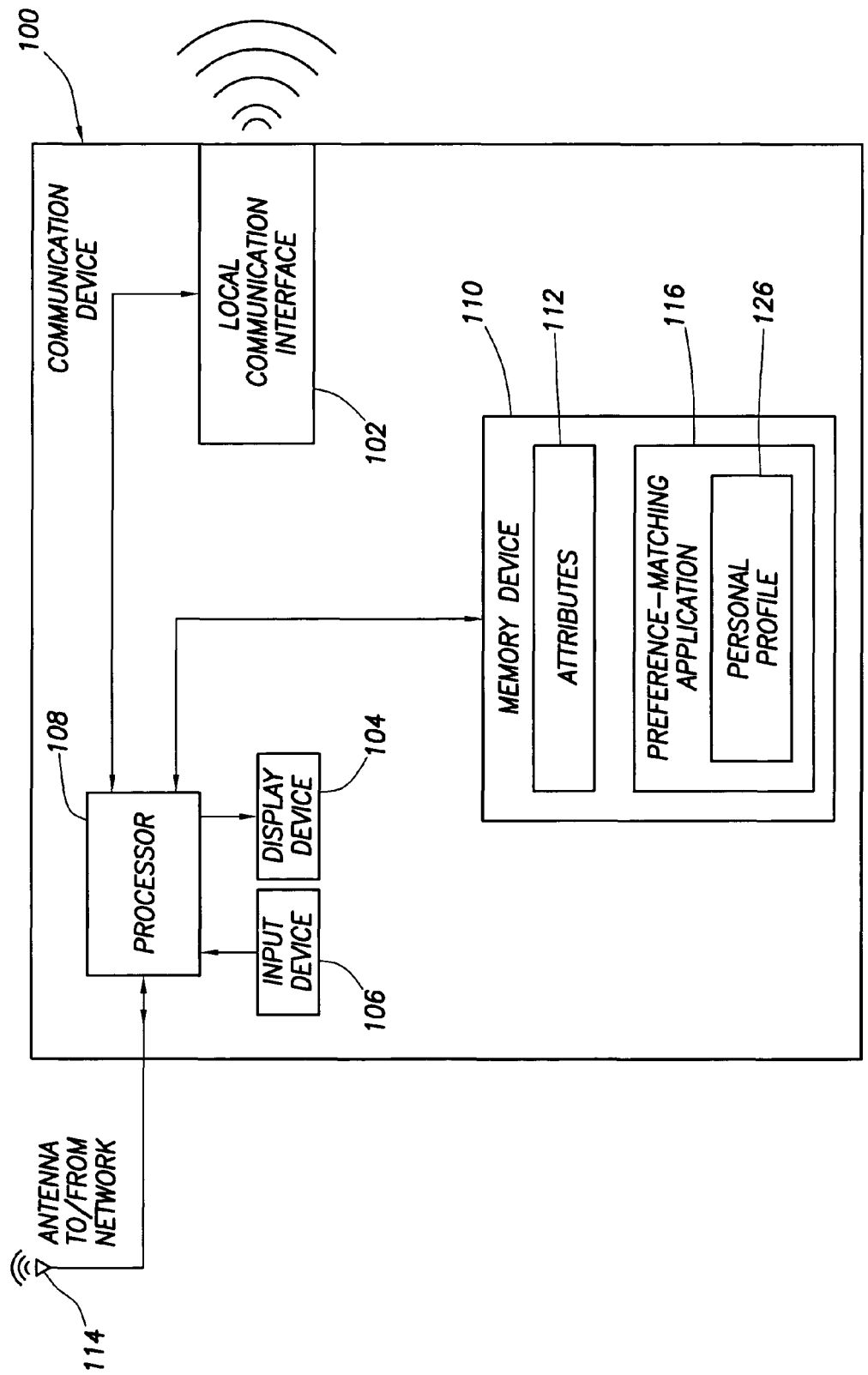
FIG. 1 illustrates a communication device constructed in accordance with embodiments of the invention.

Referring now to FIG. 1, a communication device 100 may comprise a processor 108 coupled to a local communication interface 102, a display device 104, an input device 106, a memory storage device 110 and an antenna 114. The display device 104 may comprise a text/graphics display. The input device 106 may comprise a keypad such as that found on various cellular telephones as well as a keyboard, mouse, or other types of input devices. Communication device 100 may comprise a mobile or non-mobile device such as a mobile cellular telephone, a combination mobile cellular telephone and personal digital assistant ("PDA"), a desktop computer, a laptop computer or, in general, any device on which user-specific information may be stored or otherwise accessible. As discussed below, memory storage device 110 may store one or more attributes 112. Attributes 112 may comprise or otherwise represent information associated with a user of the communication device 100. Examples of attributes 112 may include contacts, appointments, favorite restaurants or other types of user-specific data.

Each communication device 100 may communicate with one or more other communication devices 100 indirectly through the antenna 114 and a service provider network or directly (i.e., device 100-to-device 100) through the local communication interface 102. If the communication device 100 comprises a cellular telephone, antenna 114 permits the cellular telephone to send signals to and receive signals from a cellular tower. Through the cellular tower and other cellular towers and a cellular telephone service provider's network infrastructure, cellular telephones (device 100) may communicate with one another. Local communication interface 102 permits the communication device 100 to communicate directly with another device 100 without having to use the service provider's network infrastructure.

Figure 2:
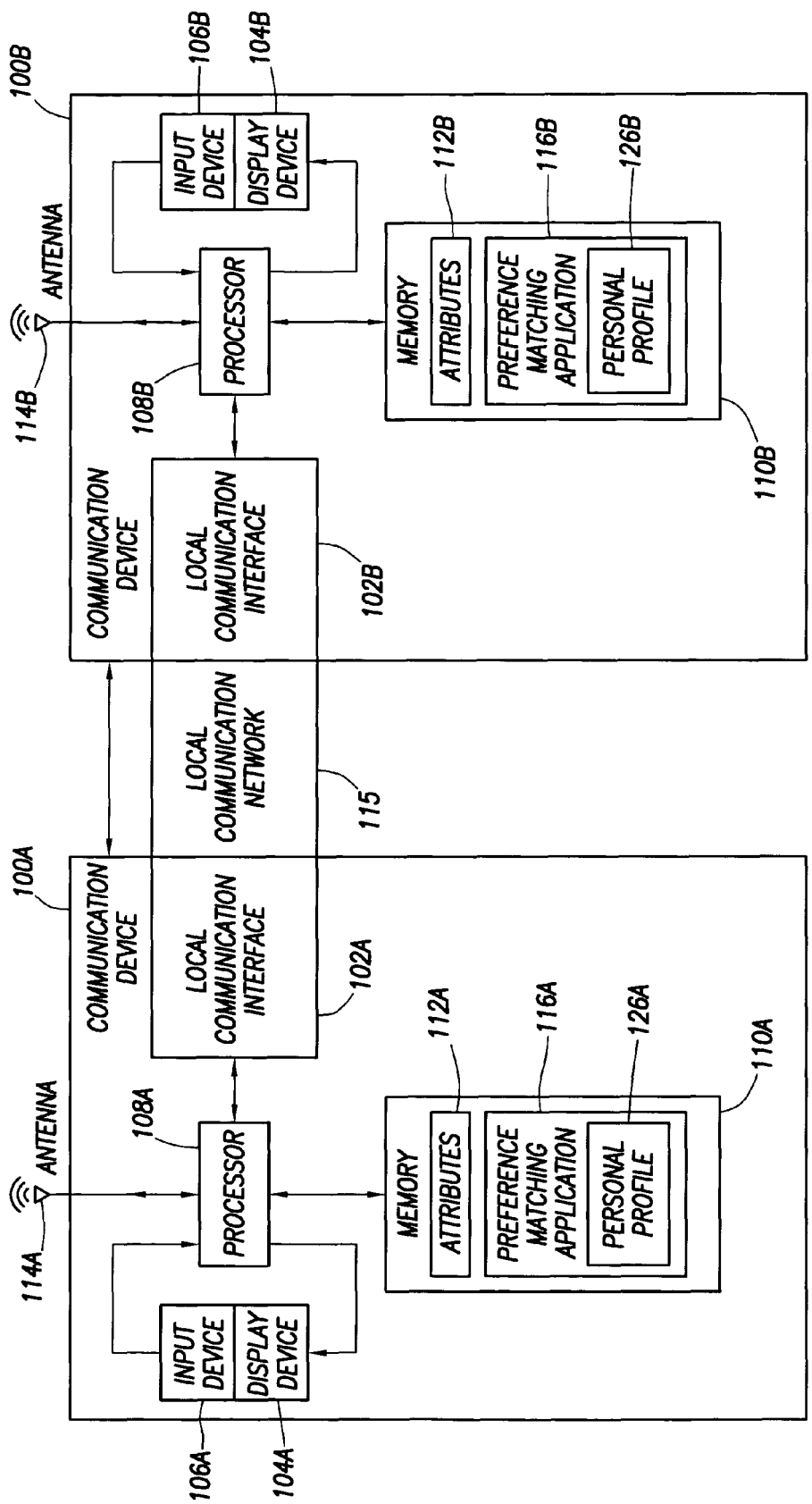
FIG. 2 illustrates an exemplary communication technique usable between two communication devices constructed in accordance with embodiments of the invention.

Referring now to FIGS. 1 and 2, the local communication interface 102 may employ the Bluetooth wireless communication protocol, but any other suitable communication protocol may be used as desired. Bluetooth generally permits Bluetooth-enabled electronic devices to send and receive data among each other. Bluetooth-enabled devices communicate with one another via radio frequency ("RF") signals. In other embodiments, the local wireless communication between devices 100 may use infrared ("IR") technology or other suitable types of wireless techniques. The local communication interface 102 of communication device 100 may communicate with the local communication interface of another communication device by establishing local communication network 115. Communication device 100 also may be equipped with a preference-matching software application 116 that, as explained below, may be used to compare that device's attributes 112 with the attributes of a separate communication device 100. A personal profile 126 also may be included within communication device 100. This personal profile 126 may contain various user settings regarding the preference-matching application. The use of the personal profile 126 is described below.

Referring still to FIGS. 1 and 2, a local communication interface 102 may operate in a "discovery" mode. In the discovery mode, the communication device 100 monitors for the presence of other communication devices 100 that also are equipped with a local communication interface 102 and a preference-matching application 116. As noted above, the local communication interface 102 of the device 100 may be Bluetooth-based. A Bluetooth enabled device can be configured to implement a discovery mode that permits the device to seek other devices via the wireless medium. The Bluetooth standard specifies the use of access codes that allow the device to specify the type of device being sought. Bluetooth communications comprise the transmission of information on 79 channels. During inquiry, devices generate an inquiry "hopping" (i.e., channel changing) sequence. The inquiry hopping sequence covers 32 of the 79 available Bluetooth channels. Once a device 100 initiates an inquiry hopping sequence, the device broadcasts beacon signals (e.g., inquiry messages) as it sequentially switches to each channel defined in the hopping sequence. If another device also performing an inquiry scan receives an inquiry message, the receiving device enters an inquiry response substrate and replies with an inquiry response message. The inquiry response includes the receiving device's address and clock, both of which are used to establish a Bluetooth connection. In general, each communication device 100 may seek out all other communication devices within the communication range of the local communication interface 102.

FIG. 2 illustrates the interaction between two communication devices 100A and 100B, each equipped with a preference-matching application 116A, 116B. Communication devices 100A and 100B may be identical or non-identical. Meaning that, devices 100A and 100B may be the same type of device (e.g., devices 100A and 100B may both be mobile phones) or devices 100A and 100B may be different types of devices (e.g., device 100A may comprise a mobile phone and device 100B may comprise a desktop computer). Communication devices 100A and 100B include one or more attributes 112A and 112B, respectively. One or more of attributes 112A may match (e.g., identical to) one or more of attributes 112B. Local communication network 115 may be established to enable the transfer of information (e.g., attributes) between the local communication interfaces 102A and 102B of communication devices 100A and 100B. This transfer of information may be performed using the Bluetooth wireless communication protocol or any communication protocol. Using local communication network 115, some or all of attributes 112A and 112B indirectly may be compared as explained below to determine the total number of matching attributes 112 between communication devices 100A and 100B. This matching process is referred to as "preference matching." To protect the confidentiality of a device's attributes, as described below, each communication device 100 encodes its attributes to protect the identity of the attributes from other communication devices 100.

Figure 3:
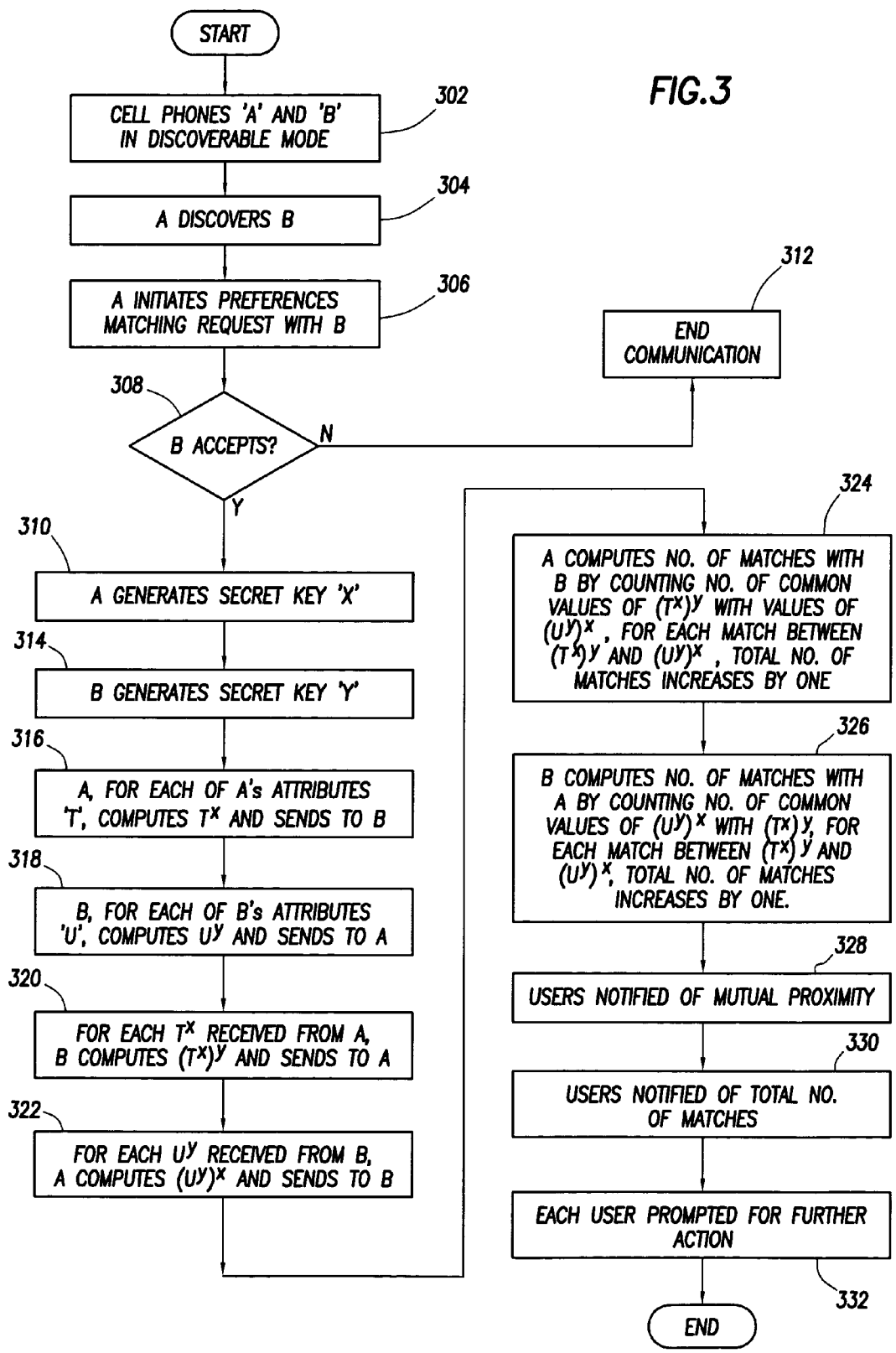
FIG. 3 illustrates a flow diagram that may be implemented in accordance with embodiments of the invention.

Referring now to FIGS. 2 and 3, FIG. 3 illustrates a flow diagram of the actions associated with implementing an exemplary preference matching process. The process in FIG. 3 may be implemented by the preference-matching applications 116A and 116B in communication devices 100A and 100B. In the following discussion communication devices 100A and 100B are referred to as "A" and "B." The process may begin with both communication devices A and B in discovery mode (block 302). Each communication device A and B may emit a beacon signal, as explained above, to locate a separate communication device. The beacons may be emitted at randomly spaced intervals, thus reducing the chance that the devices A and B emit their beacons simultaneously. If communication devices A and B simultaneously emit a beacon, a blocking effect may prevent either or both of the communication devices A and B from realizing the presence of the other communication device. Via input device 106, a user of communication device A or B also may have the option of disabling the discovery mode feature and/or associated beacon signals if the user wishes to disable the matching process. The user may stop the matching process at any time.

Still referring to FIGS. 2 and 3, the beacon emitted by communication device A may realize the presence of communication device B (block 304). At block 306, communication device A subsequently may initiate a preference-matching request with communication device B via the local communication network 115 established between communication device A and communication device B. Communication device B either may accept or decline the preference-matching request from communication device A (block 308). Declining the preference-matching request may result in the termination of communication between communication devices A and B (block 312).

At blocks 310 and 314, acceptance of the preference-matching request by communication device B may cause communication devices A and B to obtain or generate secret, numerical keys X and Y that may be used for encryption and privacy protection purposes. The keys X and Y may be generated dynamically each time a device A and B begins the preference-matching process with another device. Alternatively, the keys may be pre-loaded into memory 110 in the device A, B when the device is manufactured. The keys may comprise a random number stored in memory 110A, 110B or may be dynamically generated at any time and in any suitable fashion. In general, each key comprises a numerical value that is distinct from keys in other communication devices. The keys are used to protect the privacy of the attributes in each communication device from the other. Thus, a key may comprise a large (i.e., large enough for the stated purpose of the key), unique and/or unidentifiable numerical value.

Upon generation of secret keys X and Y (blocks 310 and 314), at block 316 communication device A, for each of communication device A's attributes (hereafter referred to as 'T,') computes T^X (attribute T raised to the power X) and transfers the results to communication device B. That is, each of A's attributes is individually raised to a power defined by key X. Similarly, communication device B, for each of communication device B's attributes (hereafter referred to as 'U,') computes U^Y (attribute U to the Y power) and transfers the results to communication device A (block 318). Thus, the results of the mathematical operations T^X and U^Y are transmitted between devices A and B. All exponentiations may be modulo some common prime number. To enhance encryption quality, security and user privacy, the values T, X, U and Y are withheld from transmission to the other communication device. Only transferring the mathematical result of computing an attribute to a power defined by a key (i.e., T^X and U^Y) without transferring the values T, X, U, or Y generally precludes the receiving device from knowing or determining the underlying key or attribute associated with the other device.

Referring still to FIG. 3, for each T^X value received from communication device A, communication device B computes (T^X)^Y and send the resulting value to communication device A (block 320). Similarly, for each U^Y value received from communication device B, communication device A computes (U^Y)^X and sends the resulting value to communication device B (block 322). Only the results of the mathematical operations (T^X)^Y and (U^Y)^X are transmitted in blocks 320 and 322, not the underlying attributes or keys. Thus, at this stage, both communication devices A and B have all of the results of the mathematical operations (T^X)^Y for each attribute T and (U^Y)^X for each attribute U. However, each device's secret key and attributes remain concealed from the other device. In at least some embodiments, communication devices A, B each may permute the other device's attributes before transmitting the attributes at blocks 320 and 322. Thus, each device may display the number of attributes both users have in common but may withhold the identities of the attributes both users have in common.

The actions outlined in blocks 310 through 322 may occur sequentially, simultaneously or in any suitable order. For instance, the secret key generation process (blocks 310 and 314) may happen one after another or may occur simultaneously. Similarly, the computation and transmission of all values of T^X by communication device A may occur before, during or after the computation and transmission of all values of U^Y by communication device B (blocks 316 and 318). Likewise, the transmission of all values of (T^X)^Y and (U^Y)^X (blocks 320 and 322) may occur in bulk form (all values of (T^X)^Y followed by all values of (U^Y)^X or all values of (U^Y)^X followed by all values of (T^X)^Y), one after another (one value of (T^X)^Y followed by one value of (U^Y)^X followed by the next value of (T^X)^Y, continuing in this fashion until all attributes have been transmitted), or in any other order.

Still referring to FIG. 3, once communication device A has received all of the (U^Y)^X values transferred from communication device B, at 324 communication device A computes the number of preference matches with communication device B by counting the number of common values of (T^X)^Y and (U^Y)^X. In at least some embodiments, a match is deemed to have occurred when a particular value (T^X)^Y is identical to a particular value (U^Y)^X, indicating that T and U in the values are identical and thus both users may have a common attribute. For each match between values of (T^X)^Y and (U^Y)^X, communication device A may increment a counter implemented in processor 118A by a suitable increment (e.g., one) to track the number of matching attributes. Similarly, at 326 communication device B may compute the number of preference matches with communication device A by counting the number of common values of (T^X)^Y and (U^Y)^X. For each match between values of (T^X)^Y and (U^Y)^X, communication device B may increment a counter implemented in processor 118B by a suitable increment (e.g., one).

Once all (T^X)^Y and (U^Y)^X values are analyzed and the total number of matches is counted by communication devices A and B, the users of communication devices A and B may be notified of their mutual proximity (block 328) and may be notified of the total number of matches (block 330). In at least some embodiments, to preserve the privacy of the users of communication devices A and B, communication devices A and B may withhold any disclosure of which specific user attributes T and U successfully matched.

Once the preference-matching process is complete, users of communication devices A and B subsequently may be prompted for further action by preference-matching applications 116A and 116B (block 332). For example, prompts to the users on device displays 104A and 104B requesting further action from the user may comprise the total number of user matches and/or an option to orally communicate with the other communication device user via antennas 114A and 114B and the service provider network(s). This latter scenario may comprise the exchange of phone numbers between communication devices over the local communication network. With the phone number of the other communication device, one communication device may initiate a call to the other communication device via antennas 114A and 114B and the service provider network(s) either by a user prompt via input device 106A, 106B or automatically. To avoid the situation of both communication devices calling each other simultaneously, both phones via local communication network 115 may cooperate to designate one phone to initiate a call. For instance, the two communication devices may compare phone numbers and allow the communication device with the larger (or smaller) number to dial. Alternatively, the communication device that initiated the preference-matching request at block 306 may be designated to initiate the call.

A prompt requesting further action from the user may additionally or alternatively comprise a notice of the other device's proximity and/or a particular image (e.g., a particular graphical image, alphanumeric code, message) seen on both device displays 104A and 104B, enabling users of communication devices A and B to find one another by visually matching the two device displays. For instance, upon completion of the preference-matching process, the users of communication devices A and B may be notified that a matching user is in the area. Communication devices A and B may agree via local communication network 115 to display the arbitrarily chosen code "ABC123" on display devices 104A and 104B. This code may be generated dynamically with each preference-matching session, stored during manufacture in a database of codes located in the memory of devices A and B or created in any suitable fashion. Each user of communication devices A and B then would search for another communication device user with the code "ABC123" displayed on his/her display device 104A or 104B. This technique is not limited to visual images; a similar technique may be applied to audio signals (e.g., matching ring tones).

A prompt requesting further action from the user also may enable each communication device user to reveal with user authorization via input device 106A, 106B personal data, such as some or all of the specific attributes that matched, text messages, interests, professional backgrounds, contacts, appointments or any personal data each device user wishes to reveal. A prompt may request each user's authorization to swap personal images, enabling each user to find the other user in the vicinity. In the latter scenario, device displays 104A and 104B may be capable of displaying photos and each user may store his/her photo on his/her communication device for this purpose.

Each user also may have the option of enabling such prompts to alert the user silently (i.e., via a vibrating feature on the communication device) or aloud (to facilitate location of the other user). A specialized, audible ring tone may correspond to the number of matches; for example, a greater number of matches may cause a relatively long ring tone. To facilitate the meeting of the users, the communication devices, upon authorization by both users, may reveal the physical location of the other user (e.g., using global positioning system technology), and/or directions to reach the other user. In this latter scenario, the communication device 100 may include a global positioning system ("GPS") receiver. The above prompt examples are only exemplary of various embodiments of the invention and should not be interpreted as a limitation on the scope of the disclosure.

A user of communication device A or B also may have the option of creating a personal profile 126A, 126B. A personal profile 126A, 126B may comprise a programmable electronic file stored in memory 110A, 110B and accessible to the preference matching application 116A, 116B. The personal profile may contain user settings regarding the preference-matching process. User settings, for example, may comprise the ability to designate particular data as information that may always, occasionally, or never be revealed before, during or after the preference-matching process. With this personal profile feature, the user also may have the option of specifying a particular match threshold number. If a first communication device user's total number of matches with a second communication device user is less than the programmed match threshold number, the first user will not be notified of any matches. Otherwise, the user will be notified. For example, if the match threshold number of the communication device A is set to 5, the user of communication device A will be alerted to a match only if the total number of matches between communication devices A and B is 5 or greater. Alternatively, the personal profile feature may enable the user to provide certain attributes with the ability to override the threshold number. For instance, if the match threshold number of communication device A is set to 5 but a particular attribute (such as the user's birth date) is provided the ability to override the threshold number, then the user of communication device A will be alerted if the user of communication device B has a matching birth date, regardless of the number of total matches.

Each user of communication devices A and B also may be provided the option of viewing the preference-matching process as it occurs or viewing only the final results of the preference-matching process. For example, if a user chooses to view the preference-matching process as it occurs, the displays 104A and 104B on communication devices A and B may display a message indicating that a preference-matching process is in progress, followed by a message indicating that the preference-matching process is complete. Then a message displaying the total number of matches with the other user may be displayed. The user then may be prompted for further action, as explained above. In this case, if, during the matching process, the distance between communication devices A and B increases due to relative movement of the devices A, B beyond the maximum distance permitted by local communication interfaces 102A and 102B, communication devices A and B may display a "failure" message on their display devices 104A and 104B. If a user chooses to view only the final result of the preference-matching process, the entire preference-matching process (blocks 302 through 330) may occur without any notification or message to the user. Once the preference-matching process is complete, the user may be notified via device display 104A or 104B of the total number of matches with the other user. The user subsequently may be prompted for further action. The preceding examples are only exemplary of various embodiments of the invention and should not be interpreted as a limitation on the scope of disclosure.

The preference-matching process also may occur with more than two communication devices. For example, given three communication devices A, B and C engaged in the preference-matching process with each other, communication devices A may complete the preference-matching process with communication device B before commencing the preference-matching process with communication device C. Alternatively, communication devices A and B may be engaged in the preference-matching process while communication devices A and C are engaged in the preference-matching process. Further still, devices A and B may be engaged in the preference-matching process, while communication devices B and C as well as A and C also are engaged in the preference-matching process, all three pairs of devices performing their preference-matching processes concurrently.

The scope of disclosure is not limited to preference matching between any two given communication devices. The preference-matching process may occur between entire groups of communication devices. For example, whereas the above preference-matching scenarios may consistently involve the comparison of the attributes of only two communication devices, the preference-matching process may compare the attributes of three or more communication devices, alerting each user not only of a match with another user but with a group of users.

What is claimed is:

1. A method usable on a first communication device adapted to communicate with a second communication device, comprising:
    obtaining a first key;
    encoding an attribute in the first communication device with the first key to produce a first encoded value;
    transmitting the first encoded value to the second communication device;
    receiving a second encoded value from the second communication device, the second encoded value comprising an attribute stored in the second communication device that has been encoded with a second key associated with the second communication device;
    encoding the second encoded value with the first key to produce a third encoded value;
    transmitting the third encoded value to the second communication device;
    receiving a fourth encoded value from the second communication device, the fourth encoded value comprising the first encoded value after being encoded by the second key; and
    if the third encoded value matches the fourth encoded value, adjusting a total number of matches; and
    enabling users of the first and second communication devices to physically locate one another only if said total number of matches meets or exceeds a threshold, wherein enabling the users to physically locate one another includes at least one of providing identical images on the first and second communication devices and emitting matching audible sounds via the first and second communication devices;
    wherein the first and second communication devices comprise mobile communication devices.

2. The method of claim 1, wherein obtaining a key comprises generating a random number.

3. The method of claim 1, wherein obtaining a key comprises reading a pre-programmed value from memory.

4. The method of claim 1, wherein encoding the attribute with the first key comprises calculating the attribute to the power of the first key to produce the first encoded value.

5. The method of claim 1, wherein the second encoded value comprises the attribute of the second device raised to the power of the second key and encoding the second encoded value with the first key comprises raising the second encoded value to the power of the first key.

6. The method of claim 1, further comprising transmitting the first communication device's attribute to the second communication device only after determining that the third encoded value matches the fourth encoded value.

7. The method of claim 1, wherein enabling the communication device users to physically locate one another comprises providing each communication device with physical location information of the other communication device.

8. The method of claim 1 further comprising emitting an audible ring tone indicative of said total number of matches.

9. A communication device, comprising:
a processor;
an antenna coupled to the processor;
memory accessible to said processor and containing an attribute and software executable on said processor;
a communication interface coupled to said processor and adapted to permit the communication device to communicate with at least one other external device;
wherein, by executing said software, said processor determines whether the communication device's attribute matches an attribute stored in an external device, without receiving the attributes from the external device, based on a first encoded value received via the local communication interface from the external device, said first encoded value being indicative of an attribute stored in the external device;
wherein, if the communication device's attribute matches the attribute stored in the external device, the communication device adjusts a number of matches;
wherein, if the number of matches does not meet or exceed a threshold, the communication device refrains from disclosing a physical location of a user of the external device to a user of the communication device, unless a predetermined attribute of the communication device matches another attribute of the external device;
wherein the communication device comprises a mobile communication device and is to allow users of the communication and external devices to speak with one another via a service provider network; and
wherein the processor enables the user of the communication device to physically locate the user of the external device by performing at least one of providing an image on the communication device and by emitting audible sounds via the communication device.

10. The communication device of claim 9 wherein the processor encodes an attribute contained within the communication device with a key to produce a second encoded value that the processor causes to be transmitted through the communication interface to the external device.

11. The communication device of claim 9, wherein the first encoded value received from the external device comprises an attribute stored in the external device that has been encoded with a key unique to the external device.

12. The communication device of claim 9, further comprising a first key stored in said memory and unique to said communication device, wherein the processor encodes the first encoded value received from the external device with the first key to produce a third encoded value.

13. The communication device of claim 12, wherein the processor transmits the third encoded value to the external device.

14. The communication device of claim 12, wherein the processor receives a fourth encoded value from the external device, the fourth encoded value comprising an encoded version of a second encoded value using the key unique to the external device, the second encoded value produced by the processor encoding an attribute contained within the communication device.

15. The communication device of claim 14, wherein the processor determines whether the third encoded value matches the fourth encoded value.

16. The communication device of claim 10, wherein the key comprises a random number.

17. The communication device of claim 9, wherein the processor transmits text messages to the external device via the local communication interface.

18. The communication device of claim 9, wherein the communication interface provides a direct, wireless communication with the external device.

19. The communication device of claim 18, wherein the communication interface implements Bluetooth.

20. The communication device of claim 9, wherein the communication device's attribute comprises an attribute selected from the group comprising contacts, phone numbers, keywords, interests, appointments and favorite restaurants.

21. A system, comprising:
a first communication device having a first plurality of attributes and a first key;
a second communication device having a second plurality of attributes and a second key, the second communication device adapted to communicate with the first communication device;
wherein the first communication device encrypts each of the first plurality of attributes with a first key to form a first plurality of encrypted values and the second communication device encrypts each of the second plurality of attributes with a second key to form a second plurality of encrypted values;
wherein the first communication device transmits each first encrypted value to the second communication device and the second communication device transmits each second encrypted value to the first communication device;
wherein the first communication device encrypts each second encrypted value with the first key to produce a third plurality of encrypted values, and the second communication device encrypts each first encrypted value with the second key to produce a fourth plurality of encrypted values;
wherein the first communication device transmits each third encrypted value to the second communication device, and the second communication device transmits each fourth encrypted value to the first communication device; and
wherein, if one of the first or second communication devices determines that any third encoded value matches any fourth encoded value, said one of the first or second communication devices enables a user of that communication device to physically locate a user of the other communication device by performing at least one of providing an image on that communication device and emitting an audible sound;
wherein the first communication device comprises a mobile communication device;
wherein the first communication device designates a subset of the first plurality of attributes as information that may always, occasionally or never be revealed to the second communication device; and
wherein the first and second communication devices allow users of the communication devices to speak with one another via a service provider network.

22. The system of claim 21, wherein each of the first communication device and the second communication device implement a discovery mode wherein each communication device monitors for the presence of another communication device.

23. The system of claim 21, wherein the first key is distinct from the second key.

24. The system of claim 21, wherein, if the first communication device is physically separated from the second communication device by a predetermined distance, the first communication device generates a message indicative of said separation.

* * * * *